US008801438B2

(12) United States Patent
Sakezles (10) Patent No.: US 8,801,438 B2
(45) Date of Patent: *Aug. 12, 2014

(54) ARTIFICIAL ANATOMIC MODEL

(71) Applicant: Christopher Sakezles, Tampa, FL (US)

(72) Inventor: Christopher Sakezles, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/684,417

(22) Filed: Nov. 23, 2012

(65) Prior Publication Data

US 2013/0177890 A1    Jul. 11, 2013

Related U.S. Application Data

(60) Provisional application No. 61/563,178, filed on Nov. 23, 2011.

(51) Int. Cl.
*G09B 23/28* (2006.01)

(52) U.S. Cl.
USPC .......................................................... 434/274

(58) Field of Classification Search
USPC .................................. 434/262, 267, 272, 274
See application file for complete search history.

(56) References Cited

U.S. PATENT DOCUMENTS

| 2,995,833 | A | * | 8/1961 | Bezark .......................... 434/274 |
| 3,802,096 | A | | 4/1974 | Matern |
| 4,351,822 | A | | 9/1982 | Allen |
| 4,433,961 | A | * | 2/1984 | Chandler ...................... 434/274 |
| 4,455,318 | A | | 6/1984 | Maurice et al. |
| 4,646,334 | A | | 2/1987 | Zerhouni |
| 4,734,039 | A | * | 3/1988 | Thompson ..................... 434/274 |
| 4,850,877 | A | * | 7/1989 | Mason et al. .................. 434/274 |
| 4,867,686 | A | | 9/1989 | Goldstein |
| 5,320,537 | A | | 6/1994 | Watson |
| 5,680,590 | A | | 10/1997 | Parti |
| 5,908,302 | A | | 6/1999 | Goldfarb |
| 5,945,056 | A | | 8/1999 | Day et al. |
| 5,947,744 | A | | 9/1999 | Izzat |
| 6,030,379 | A | | 2/2000 | Panescu et al. |
| 6,056,745 | A | | 5/2000 | Panescu et al. |
| 6,062,866 | A | | 5/2000 | Prom |
| 6,132,463 | A | | 10/2000 | Lee et al. |
| 6,205,871 | B1 | | 3/2001 | Saloner et al. |
| 6,206,703 | B1 | * | 3/2001 | O'Bannon ..................... 434/274 |
| 6,234,804 | B1 | * | 5/2001 | Yong .............................. 434/267 |
| 6,361,729 | B1 | * | 3/2002 | Strover et al. ................. 264/247 |
| 6,474,993 | B1 | * | 11/2002 | Grund et al. ................... 434/262 |
| 6,488,507 | B1 | | 12/2002 | Stoloff et al. |
| 6,511,325 | B1 | | 1/2003 | Lalka et al. |
| 6,589,057 | B1 | | 7/2003 | Keenan et al. |
| 6,695,619 | B2 | * | 2/2004 | Brown-Wilkinson ........ 434/274 |
| 6,773,263 | B2 | | 8/2004 | Nicholls et al. |
| 6,780,016 | B1 | | 8/2004 | Toly |
| 6,887,082 | B2 | | 5/2005 | Shun |

(Continued)

*Primary Examiner* — Kurt Fernstrom (74) *Attorney, Agent, or Firm* — Timothy H. Van Dyke; Beusse, Wolter, Sanks, Mora & Maire, P.A.

(57) ABSTRACT

Disclosed herein are anatomic models that comprise components that simulate human or non-human animal components. The models may be used for development, experimentation, or training in the field of orthopedic surgical devices, and/or implant devices. The models may also be used for training of students in the medical field for procedures performed in practice, such as for example drawing blood from a patient, or placing a central line in a carotid artery of a patient. In exemplary embodiments, the models comprise structures such as cartilage, tendons, ligaments, organs, luminal structures, and muscles that are made of hydrogel materials.

23 Claims, 7 Drawing Sheets

(56) References Cited

U.S. PATENT DOCUMENTS

| | | |
|---|---|---|
| 6,939,138 B2 | 9/2005 | Chosack et al. |
| 6,997,719 B2 | 2/2006 | Wellman et al. |
| 7,008,232 B2 | 3/2006 | Brassel |
| 7,191,110 B1 | 3/2007 | Charbel et al. |
| 7,255,565 B2 | 8/2007 | Keegan |
| 7,384,268 B2 * | 6/2008 | Browne-Wilkinson ....... 434/274 |
| 7,549,866 B2 | 6/2009 | Cohen et al. |
| 2002/0098467 A1 * | 7/2002 | Dente ........................... 434/262 |
| 2003/0044395 A1 | 3/2003 | Morgan et al. |
| 2003/0044758 A1 | 3/2003 | Ray |
| 2003/0198925 A1 | 10/2003 | Dowell |
| 2004/0009459 A1 | 1/2004 | Anderson et al. |
| 2004/0118224 A1 | 6/2004 | Tate et al. |
| 2004/0126746 A1 | 7/2004 | Toly |
| 2004/0234933 A1 | 11/2004 | Dawson et al. |
| 2005/0100873 A1 | 5/2005 | Meythaler et al. |
| 2005/0106545 A1 | 5/2005 | Heruth et al. |
| 2006/0051729 A1 * | 3/2006 | Zeeff ............................ 434/274 |
| 2007/0148626 A1 | 6/2007 | Ikeda |
| 2008/0076099 A1 | 3/2008 | Sarvazyan et al. |
| 2011/0269109 A2 * | 11/2011 | Miyazaki ...................... 434/267 |
| 2012/0288839 A1 * | 11/2012 | Crabtree ....................... 434/267 |
| 2013/0101973 A1 * | 4/2013 | Hoke et al. .................... 434/267 |

* cited by examiner

ARTIFICIAL ANATOMIC MODEL

CROSS-REFERENCE TO RELATED APPLICATIONS

This application is related to U.S. Provisional Application 61/563,178 filed Nov. 23, 2012. The teachings of this application are incorporated in their entirety and priority to the application is claimed under 35 USC 119.

BACKGROUND

Many surgeries performed today are considered to be routine, with complication rates that are generally low and where problems related to anatomy seldom arise. However, certain surgeries subject the patient to a greater level of risk and involve procedures that are made more complex by the presence of tortuous and difficult to treat anatomy. Neurological, coronary, and thoracic vascular procedures fall into this category due to the sensitive areas involved, but some of the complications simply involve an inability to reach the target vasculature. Difficulty in reaching the target site in these cases leads to a longer procedure, since the surgeon must find the most suitable approaches and instrumentation to use on a particular patient's anatomy by trial and error. Extending the length of the procedure greatly increases the probability of adverse surgical events, including death. Unfortunately, standard equipment and procedures are not available in these cases because of patient-to patient anatomical variability.

During the training of any medical professional, science, or pre-medical student, hands-on training is essential. The standard for such training has been the use of human cadavers, which are expensive and difficult to obtain. Also, the risks associated with the use of human cadavers including risks relating to the exposure to biohazards, for example, formaldehyde presents a disadvantage of using human cadavers for training purposes. Furthermore, cadaver models provide a fairly accurate representation of size and geometry, but the mechanical properties of the target anatomy are altered by death of the subject and by the required tissue preservation techniques. It is therefore impossible to use these models at normal body temperature or in the presence of fluids.

Animals are also often used for training purposes in the scientific and medical fields; however animal models suffer from a whole range of unique problems, including the many deviations between human and animal anatomy and physiology, the confounding effects of variation between individual animals, and the unpredictability that arises from using a model that is extraordinarily complex.

Animal models may include live canine, porcine, or bovine specimens, among others. While these animals do offer an in vivo environment, their anatomy and physiology differs significantly from that of a human. The specialized facilities required to house the animals and the expenses associated therewith limit their in-house use. Reproducibility may also be an issue as both inter- and intrasubject variability are difficult to control. Additional considerations include contention with the Animal Welfare Act, the significant expense associated with contracting regulated facilities and medical practitioners, and the risks related to handling biohazardous materials.

Human anatomical models have been proposed using elastomeric compositions for human tissue. However, there has not been a model training device that includes the necessary level of detail and similarity to a human body, including the finer aspects of human tissue, and the functionality of systems of the human body necessary for effective training. Difficulty has been found in the prior art in replicating human tissue at a level at which the final product bears sufficient similarity and functions in a way that is nearly parallel to that of the human body.

SUMMARY

The need for a system that allows surgeons and medical students to perform trial surgical and other medical procedures on an anatomic model of a human or non-human torso bearing a sufficient similarity to a human torso has been realized herein. This system would enable a surgeon or medical student to optimize instrumentation and surgical approaches for that particular procedure without putting a patient at risk. One aspect of the subject invention provides an anatomic model of a human or non-human torso including materials that closely mimic the physical properties of living tissues. The use of this model would enable the surgeon to perform a trial run surgery in an environment that closely resembles the patient's anatomy without any risk to the patient, or the medical student to learn how to perform a particular procedure before having to perform it on a patient.

One important feature of certain embodiments of the subject invention is the implementation of synthetic materials that can simulate one or more physical properties of living tissues. These materials are in most cases hydrogel materials that are designed on the basis of physical tests performed on actual living target tissues. For example, a particular analog material might be designed to exhibit a tensile strength close to 10 kPa to mimic a target tissue that exhibits a tensile strength of 10 kPa. One or more components made from these materials are then assembled into a configuration that mimics both the size and geometry of the target anatomic structure.

In certain embodiments, the subject invention pertains to anatomic models that comprise components that simulate human or non-human animal components. The models may be used for development, experimentation, or training in the field of orthopedic surgical devices, and/or implant devices. The models may also be used for training of students in the medical field for procedures performed in practice, such as for example drawing blood from a patient, or placing a central line in a carotid artery of a patient. In exemplary embodiments, the models comprise structures such as cartilage, tendons, ligaments, organs, luminal structures, and muscles that are made of hydrogel materials. The models provide an effective teaching and training device, due to their similarity to real tissues, organs and organ systems, as well as the simplicity in the replacement of parts or components which are damaged or used during the training. In certain embodiments, the components of the anatomic models (e.g., modules, individual muscles, ligaments, etc.) are replaceable independently of one another, providing a substantial cost-saving feature over current teaching devices in the field which require replacement of an entire teaching model or large sections of a model.

DEFINITIONS

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The terms "anatomic(al) teaching model", "anatomic(al) model", and "model training device" are used interchangeably, herein.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The tissues and structures that "are comprised of, in part or in whole, a hydrogel," aside from hydrogel materials, may include, but are not limited to, hydrophillic polymers, interpenetrating or semi-interpenetrating polymer networks, fibers, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof. For model embodiments comprising one or more components, each component part may be constructed from one or more tissue analog materials.

The modules, bones, muscular tissues, ligaments, tendons, skin layers, and luminal structures are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue, module, or structure is designed so that one or more of its physical characteristics will sufficiently match the corresponding physical characteristic(s) of the relevant tissue on which the module, bone, muscular tissue, ligament, tendon, skin layer or luminal structure is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:

(1) Shigley, J. E., and Mischke, C. R. *Mechanical Engineering Design*, $5^{th}$ Ed., McGraw-Hill, 1989.

(2) Harper, C. A., *Handbook of Materials for Product Design*, $3^{rd}$ Ed., McGraw-Hill, 2001.

(3) Askeland, D. R., *The Science and Engineering of Materials*, $2^{nd}$ Ed., PWS-Kent, 1989.

(4) LaPorte, R. J., *Hydrophilic Polymer Coatings for Medical Devices*, Technomic Publishing, 1997

(5) Hayt, W. H., and Kemmerly, J. E., *Engineering Circuit Analysis*, $4^{th}$ Ed., McGraw-Hill, 1986.

(6) Park, J. B., and Lakes, R. S., *Biomaterials, An Introduction*, $2^{nd}$ Ed., Plenum Press, 1992.

(7) Lindenburg, M. R., Editor, *Engineer in Training Manual*, $8^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation," *International Symposium*-ISMS 2004, Cambridge, Mass., Jun. 17-18, 2004 and references cited therein; and Brouwer et al. "Measuring in Vivo Anaimal Soft Tissue Properties for Haptic Modeling in Surgical Simulation", *Proc. Medicine Meets Virtual Reality*, Newport Beach, Calif., IOS Press, 2001, and references cited therein.

Particular teachings of certain physical characteristics are noted (references numbers related to preceding list):

Tensile strength and modulus, both measured in Pascal (Pa)—Ref 1, pg 186.

Compressive strength and modulus, both measured in Pascal (Pa)—Ref 2, pg 718.

Shear strength and modulus, both measured in Pascal (Pa)—ASTM Standard D3165-00, Standard Test Method for Strength Properties of Adhesives in Shear by Tension Loading of Single-Lap-Joint Laminated Assemblies.

Coefficient of static and dynamic friction, a dimensionless number—Ref 7, pg 445.

Surface tension, measured in dynes/cm—Ref 6, pg 57.

Wettability, measured in terms of contact angle (degrees)—Ref 4, pg 3.

Water content, measured in mass percent (%)—Ref 4, pg 41.

Electrical resistance and conductance, measure in ohm for resistance and mho for conductance—Ref 5, pg 25.

Dielectric properties, measured in various units—ASTM Standard E2039-04 Standard Test Method for Determining and Reporting Dynamic Dielectric Properties.

Optical absorption and transmission, measured in $cm^{-1}$—Ref 3, pg 739.

Thermal conductivity, measured in cal/(cm-s-C)—ASTM Standard D5930-01 Standard Test Method for Thermal Conductivity of Plastics by Means of a Transient Line-Source Technique.

Porosity, measured in volume percent (%)—Ref 3, pg 490.

Moisture vapor transmission rate, measured in $g/(mil-in^2)$—Ref 2, pg 941.

The term "artificial" as used herein to describe an anatomic model refers to a model that is either synthetically manufactured or naturally manufactured in vivo and assembled with model components. The anatomic model includes model components such as modules, muscular tissue, ligament structures, tendons, bones, and other such structures or "components." In the case of naturally manufactured artificial components, this may refer to actual tissues or anatomical structures procured from a cadaveric human or from a nonhuman subject that are removed from the subject processed and assembled with other artificial components.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "human or non-human animal tissue" as used herein refers to the one or more tissues that constitute a human or non-human animal anatomical structure. "Anatomic structures" may include tissue types, bone types, organ types, and/or part of organ(s).

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

DETAILED DESCRIPTION

There is much interest in the development of anatomic models with components that simulate those of a human with significant similarity for use in education, training, and practice of students and professionals. More preferably, an anatomic model with easily removable and replaceable anatomic structures is essential to a successful medical learning environment. The model embodiments of the subject invention may serve as a highly sophisticated testing and learning system enabling a surgeon or medical student to optimize instrumentation and surgical approaches for a particular procedure before having to perform the procedure on a live patient.

Accordingly, in one embodiment, an artificial anatomic model configured to geometrically mimic a human or non-human animal torso is provided. The torso includes one or more bones, the one or more bones geometrically mimic at least a portion of one or more human or non-human animal bones. The torso also includes a cavity configured to receive at least one module, the cavity and the at least one module is comprised of, in part, or in whole, a hydrogel, and the at least one module geometrically mimics at least a portion of a human or non-human animal organ. A muscular tissue is also provided as part of the torso, the muscular tissue is comprised of, in part or in whole, a hydrogel. The muscular tissue geometrically mimics at least a portion of a human or non-human animal muscular tissue and simulates at least one predetermined physical characteristic of muscle tissue with at least fifty percent or more similarity.

The artificial anatomic model further includes one or more tendons, wherein the one or more tendons are comprised of, in part or in whole, a hydrogel, and the one or more tendons geometrically mimic at least a portion of a human or non-human animal tendon. The at least one or more tendons simulate at least one predetermined physical characteristic of tendon tissue with at least fifty percent or more similarity. The artificial anatomic model also includes one or more ligaments. The one or more ligaments are comprised of, in part or in whole, a hydrogel, and the one or more ligaments geometrically mimic at least a portion of a human or non-human animal ligament and simulate at least one predetermined physical characteristic of ligament tissue with at least fifty percent or more similarity. At least one luminal structure is provided in the artificial anatomic model, the at least one luminal structure is comprised of, in part or in whole, a hydrogel. The at least one luminal structure geometrically mimics at least a portion of a human or non-human animal luminal structure and simulates at least one predetermined physical characteristic of a luminal tissue with at least fifty percent or more similarity.

Typical engineering materials, including many metals, ceramics, and plastics commonly employed in industry may be used in creating the anatomic model depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particularly advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

The models of the subject invention may employ a wide variety of hydrogel materials, including but not limited to polyvinyl alcohol, polyvinyl pyrrolidone, polyethylene oxide, polyhydroxyethyl methacrylate; polyethylene glycol, hyaluronic acid, gelatin, carrageen, alginates, chondroitan sulfate, dermatan sulfate (and other proteoglycans). This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly (vinyl alcohol) is normally produced by the acid-catalyzed hydrolysis of poly (vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100 C to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale.

The models of the subject invention are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to obtain the geometric data directly from a patient.

After collecting the appropriate geometric data, the individual model components may be fabricated from appropriate analog materials. Depending on the complexity of the part and the type of materials used, the individual component might be molded, extruded, or machined. The models of the subject invention are constructed from multiple components, and these individual components are fabricated in such a way that they mimic the geometry (length, width, diameter, thickness, cross-section, shape, etc) of a particular portion of the target anatomy.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

The anatomic model of claim 1, wherein the at least one predetermined physical characteristic of muscle tissue, tendon tissue and/or ligament tissue comprises at least one of the following: color, tensile modulus, shear strength, puncture resistance, compressive modulus, dielectric constant, electrical conductivity, and/or thermal conductivity.

The anatomic model is provided in an embodiment wherein the at least one predetermined physical characteristic of luminal tissue comprises at least one of the following: coefficient of friction and abrasion resistance.

The anatomic model is provided in an embodiment wherein said organ is a diseased organ and/or wherein said muscular tissue is a diseased muscular tissue. In another embodiment, the anatomic model is provided wherein the at least one luminal structure is diseased.

In another embodiment, the anatomic model is further provided wherein the organ is a visceral organ. In a further embodiment, the visceral organ comprises at least one of kidneys, liver, gallbladder, pancreas and spleen.

The anatomic model is provided in another embodiment wherein the organ is a sensory organ.

In a further embodiment, at least one luminal structure of the anatomic model is removably attachable to an organ, a muscle, a tendon, a ligament, or another luminal structure. In a more particular embodiment, the muscular tissue is removably attachable to the one or more bones by a composite pin. The anatomic model is provided in another embodiment wherein the muscular tissue, the one or more tendons, the one or more ligaments, the one or more bones, and/or the at least one luminal structure are attachable to one another and/or to the cavity by an attachment mechanism comprising suture, Velcro, pins, composite pins, hook, and/or glue.

The anatomic model is provided in another embodiment, wherein the cavity is an abdominal cavity, and the abdominal cavity is sealed such that it is capable of insufflation.

In one embodiment, the luminal structure comprises an attaching end, wherein the attaching end comprises an attachment piece. The attachment piece comprises a narrow collared portion and a flanged portion, wherein the narrow collared portion fits over the attaching end of the luminal structure, and wherein the luminal structure is folded around the outside of the flanged portion of the attachment piece.

The anatomic model is provided in a further embodiment, wherein the at least one luminal structure is removably attachable to another of the at least one luminal structures, wherein the attaching ends of each luminal structure are joined together such that there is an uninterrupted communication between the at least one luminal structure and the other of the at least one luminal structures, providing a passageway between the luminal structures.

In one embodiment the anatomic model is provided wherein the muscular tissue comprises multiple individual muscles. In another embodiment, the multiple individual muscles are independently replaceable of one another. In another embodiment, the anatomic model is provided wherein the module are independently replaceable of one another.

In a further embodiment, the anatomic model is provided wherein the at least one luminal structure is independently replaceable. In another embodiment, the one or more bones are independently replaceable of one another. In yet another embodiment, the one or more tendons are independently replaceable of one another. In still another embodiment, the one or more ligaments are independently replaceable of one another.

In another embodiment, the anatomic model is provided further comprising a skin layer, wherein the skin layer covers over at least a portion of the torso. In a further embodiment the skin layer includes an epidermis, a dermis, and a subcutaneous tissue layer. In yet a further embodiment, the epidermis, dermis, and subcutaneous tissue layers are independently removable and replaceable of one another. In a particular embodiment, the subcutaneous tissue layer is affixed to the dermis layer by a suture line, Velcro, a zipper, or other similar form of attachment.

In another embodiment, the anatomic model of the subject invention is provided wherein the modules are attached to the one or more bones, other modules, or to the cavity with fascia sacs, wherein the fascia sacs mimic a human or non-human animal fascia tissue with fifty percent or more similarity.

In yet another embodiment, the anatomic model is provided wherein the at least one luminal structure comprises a tubular structure. In a further embodiment, the tubular structure is an artery, a vein, or a capillary.

In another embodiment, an artificial anatomic model system including the artificial anatomic model is provided. The anatomic model system includes a respiratory system, said respiratory system mimicking at least a portion of a human or non-human animal respiratory system, wherein the respiratory system includes a trachea, lungs, and a diaphragm, and the respiratory system mimics at least a portion of the functions of a human or non-human animal respiratory system.

In another embodiment, an artificial anatomic model system is provided including the artificial anatomic model. The model system further including a digestive system, wherein the digestive system mimics at least a portion of a human or non-human digestive system, between an esophagus and a rectum, and wherein the digestive system mimics at least a portion of the functions of a human or non-human animal digestive system.

In another embodiment, an artificial anatomic model system is provided including the artificial anatomic model. The model system further including a circulatory system, wherein the circulatory system mimics at least a portion of a human or non-human circulatory system, and wherein the circulatory system mimics at least a portion of the functions of a human or non-human circulatory system. In a further embodiment of the artificial anatomic model system, the circulatory system comprises a heart, at least one coronary artery, an aorta, a vena cava, and at least one primary arterial and venous trunk. In still a further embodiment, synthetic blood is pumped through the anatomic model, such that the flow of blood mimics at least a portion of the flow of blood of a human or non-human circulatory system.

Descriptions of the Illustrative Embodiments

Figure 1:
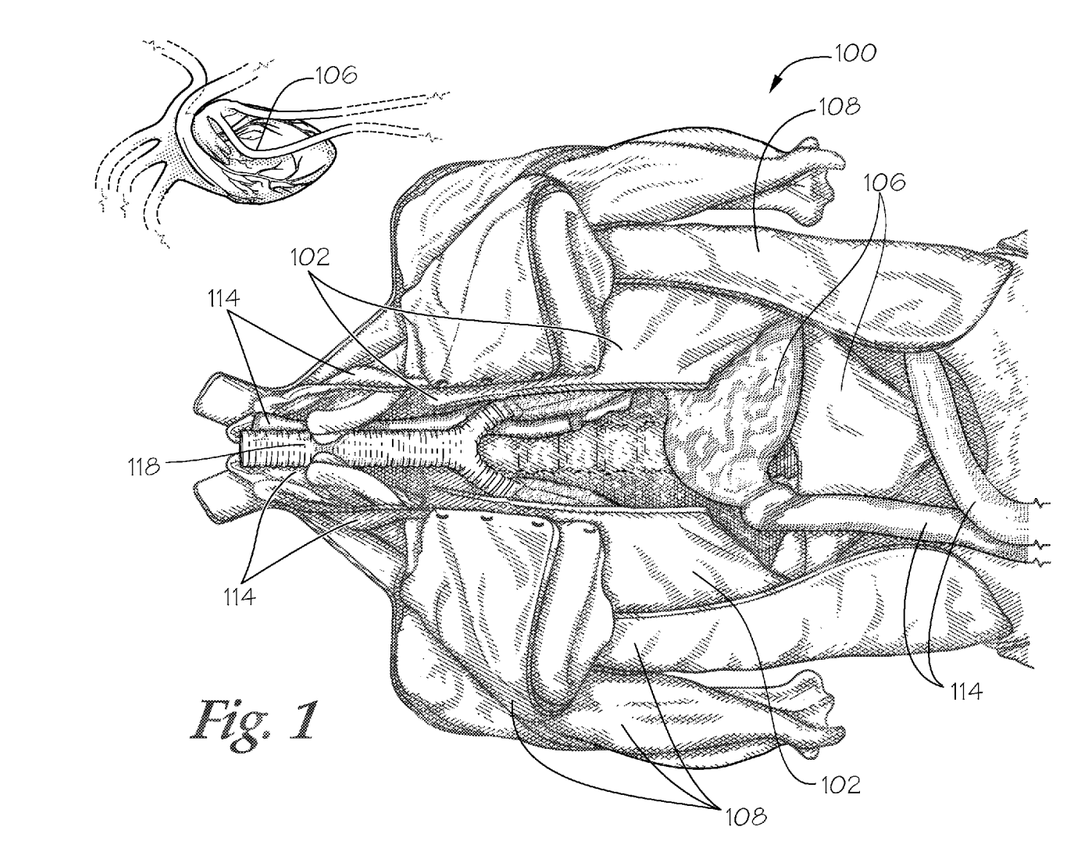
FIG. 1 provides an open-ribcage ventral view of an anatomic model of a human torso.
Figure 2:
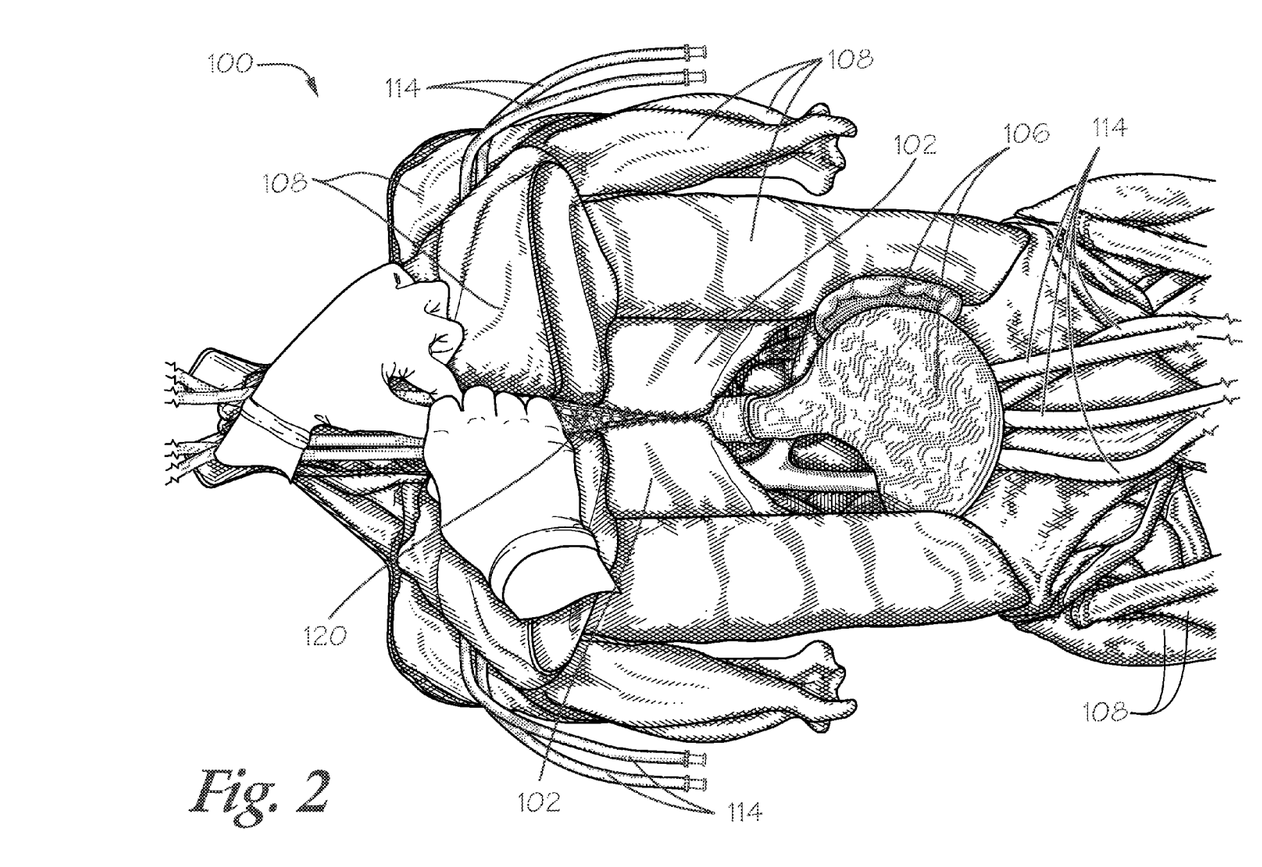
FIG. 2 illustrates a semi-closed ribcage ventral view of an anatomic model of a human torso.

Turning to the figures, FIG. 1 shows a ventral portion of an anatomic model of a human torso 100 with a split sternum providing a view into the cavity 104. Due to the open position of the cavity 104, portions of modules 106 are shown in the mid abdominal area. Luminal structures 114 are seen both anterior and posterior to the torso 100, and run through the torso 100 from the neck region through to the reproductive region (not shown in Figures). A portion of the ribcage 102 is shown in the Figure as well as the muscular tissue 108 shown ventral to the ribcage 102. FIG. 2 illustrates the torso 100, a semi-closed state, with sutures 120 being used to connect both sides of the ribcage 102. The modules 106 are more clearly visible in FIG. 2.

Figure 3:
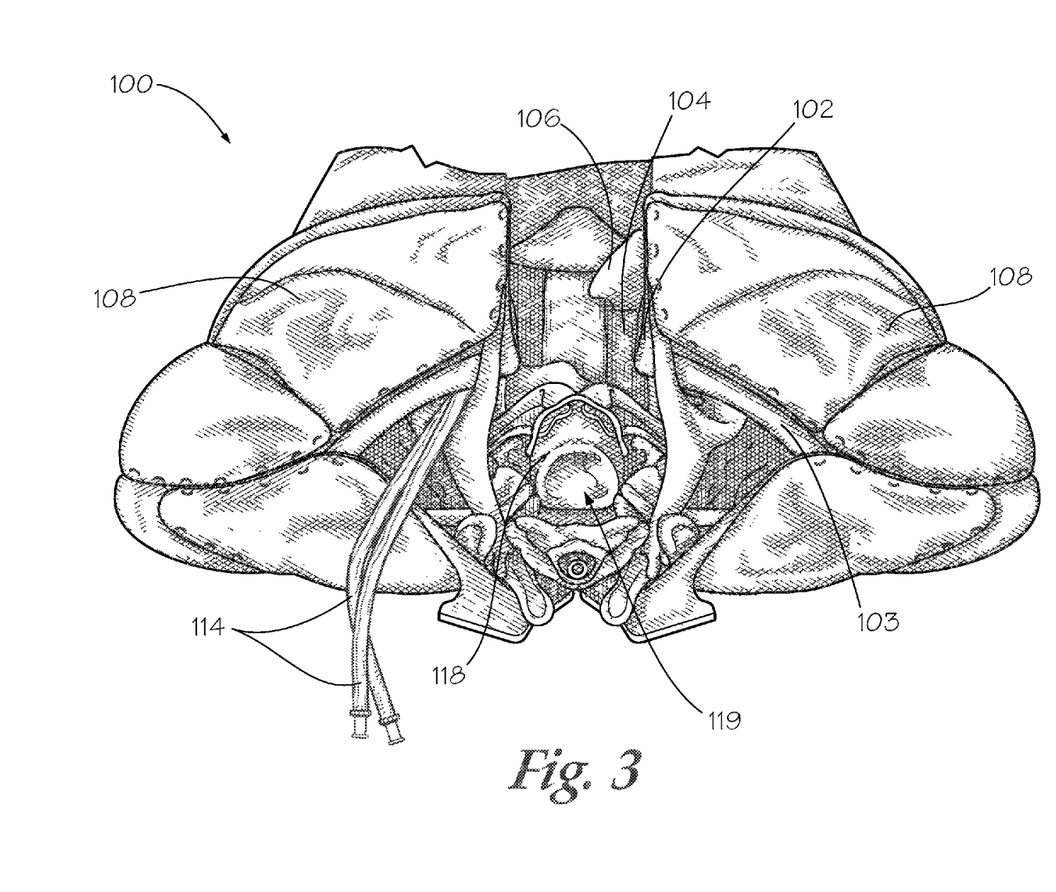
FIG. 3 shows an anterior view of the ventral side of an anatomic model of a human torso.

FIG. 3 shows an anterior view of the ventral side of an anatomic model of a human torso 100 looking down toward the posterior end of the torso 100. The sternum is split, such that the trachea 119 is visible. The clavicle 103 is also visible from this angle, as well as the muscle tissue 108 forming the pectoris muscles. Luminal structures 114 which provide a connection between the head (not shown) and the torso 100 are visible in FIG. 3.

Figure 4:
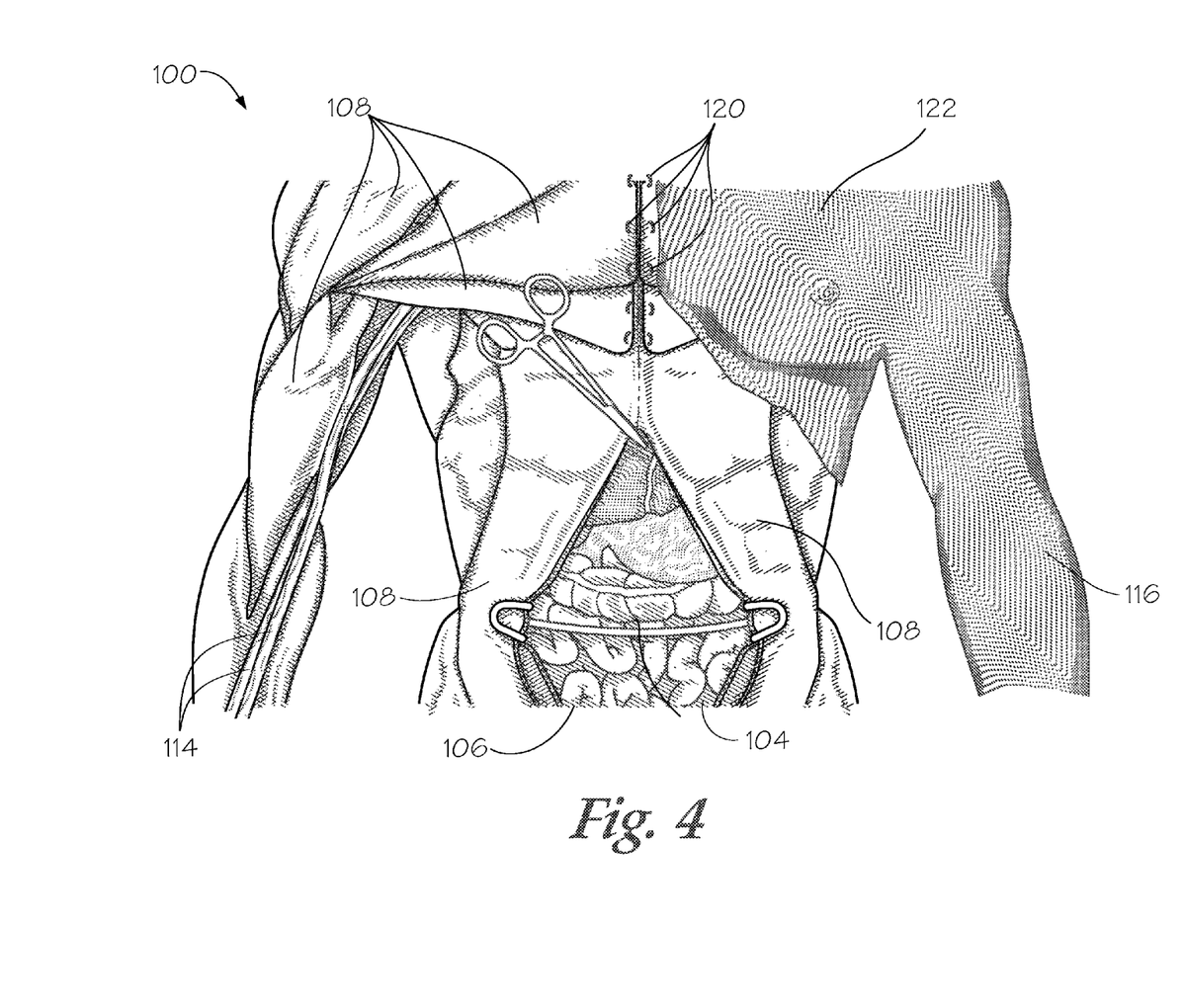
FIG. 4 provides a ventral view of an anatomic model of a human torso, the abdominus muscle cut open down the centerline showing the interior of the cavity.

FIG. 4 provides a ventral view of an anatomic model of a human torso 100, the abdominus muscle 108 cut open down the centerline showing the interior of the cavity 104. Sutures 120 are used in this embodiment to hold the muscle tissue 108 to the bone 102. Modules 106 are visible through the opening in the abdominus, revealing the inside of the cavity 104. Luminal structures 114 are visible from inside the armpit area, extending downward on the interior side of the arm. Musculature 108 of the right arm is shown in the Figure. The left side of the body provides a view of a skin layer 116, the epidermis 122 covering the upper portion of the left side of the model 100.

Figure 5:
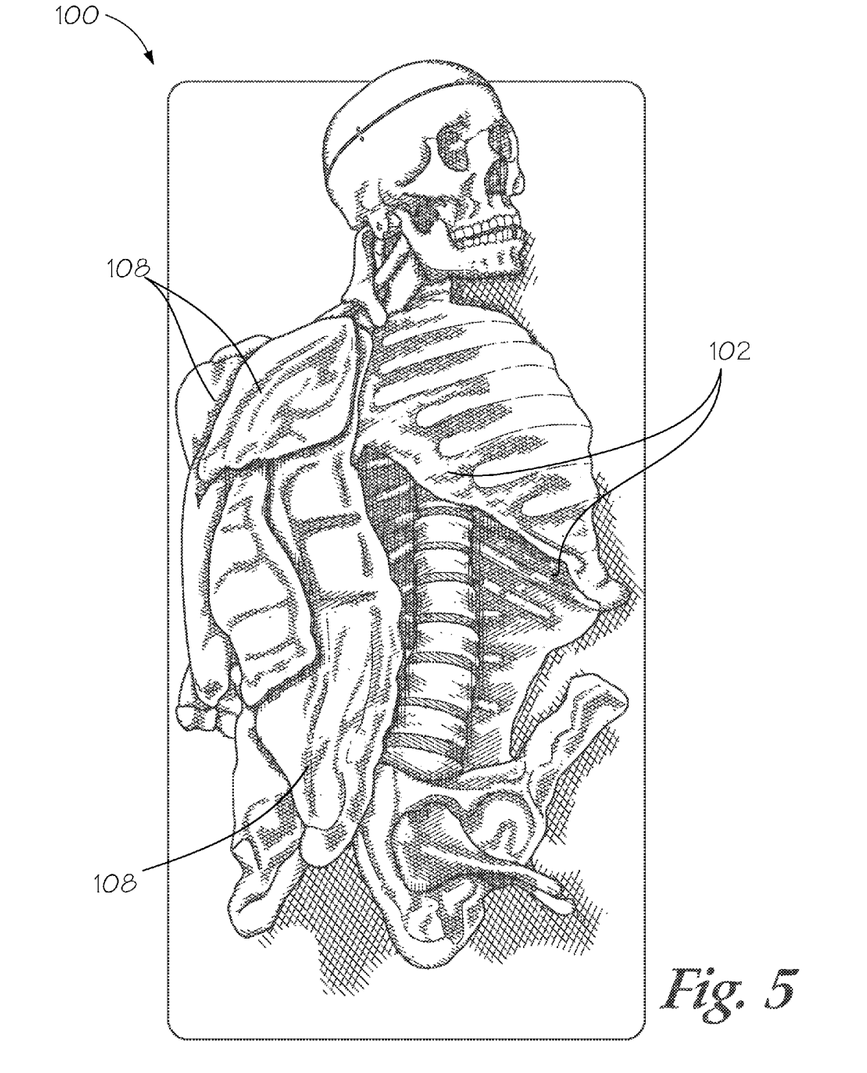
FIG. 5 provides a ventral view of an anatomic model of a human torso with one half of the torso covered in musculature, the other half of the torso showing the skeletal bone structure.
Figure 6:
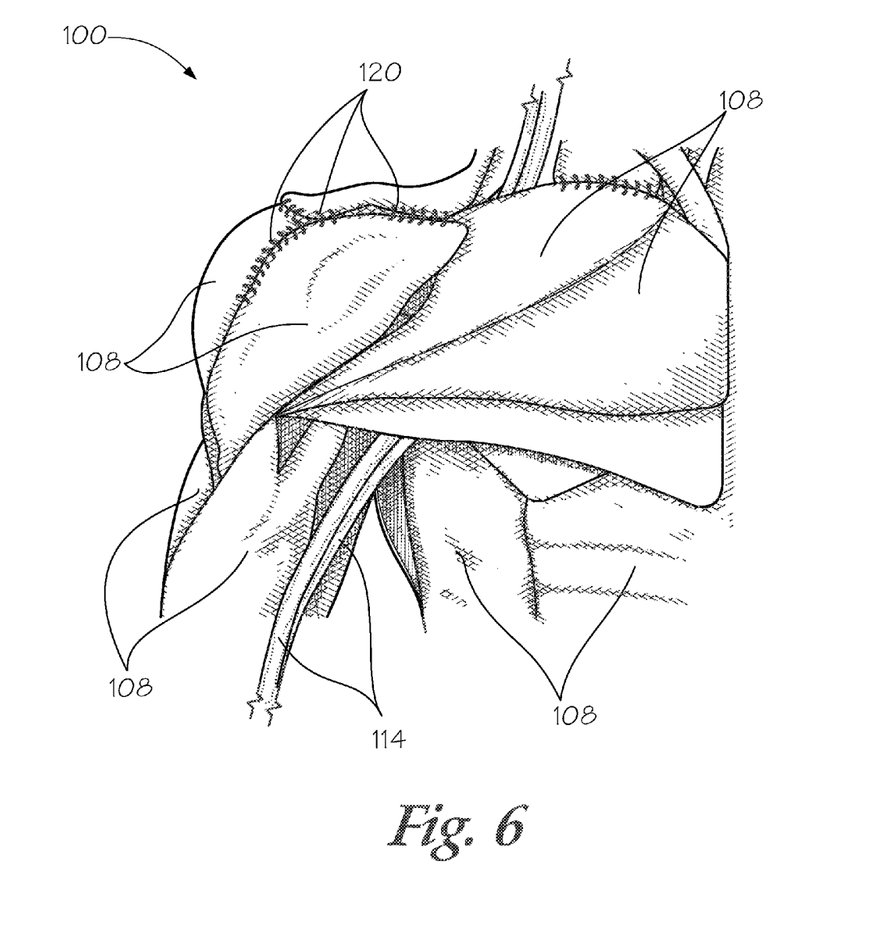
FIG. 6 provides a ventral view of an anatomic model of a human right shoulder complete with musculature.

FIG. 5 shows a ventral view of the anatomic model of a human torso 100 with one half of the torso covered in musculature 108, the other half of the torso showing the skeletal bone structure 102 that provides the structure for the anatomic model 100. FIG. 6 provides a ventral view of a portion of an anatomic model 100 of a human right shoulder complete with musculature 108.

Figure 7:
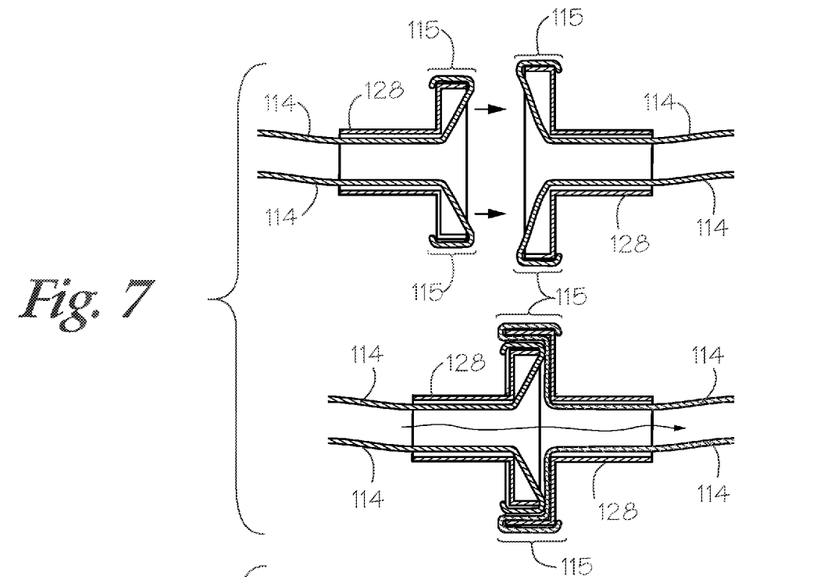
FIG. 7 provides a side view of the attachment ends of two luminal structures with attachment pieces.
Figure 8:
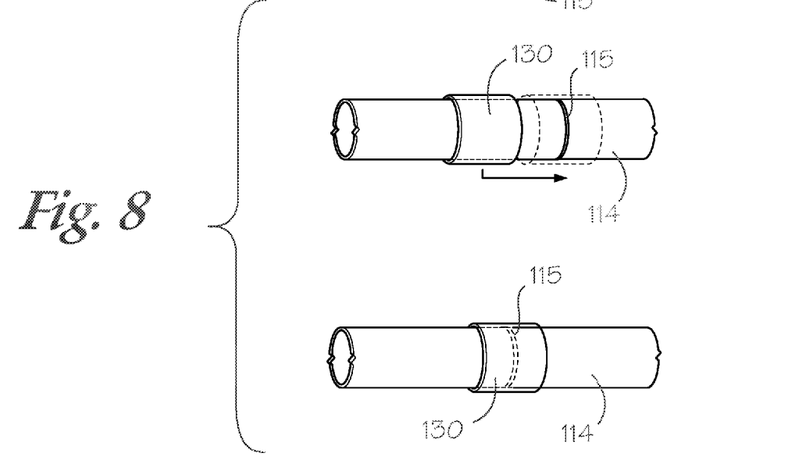
FIG. 8 illustrates two luminal structures being joined together by an attachment collar.

FIGS. 7 and 8 illustrate two embodiments of attachment structures, used to connect luminal structures to one another, and can be used to attach muscles, organs, ligaments, tendons, skin, cartilage, bone, and other structures to one another in various embodiments. In FIG. 7, an embodiment of an attachment structure is provided, wherein two attachment pieces 128 are located at each attachment end 115 of each luminal structure 114. The attachment pieces 128 comprise a narrow collared portion and a flanged portion. The attachment end 115 of the luminal structure 114 is inserted into the narrow collared portion of the attachment piece 128 and folded over the flange portion of the attachment piece 128. The flanged portions of the attachment pieces 128 are associated with one another such that the attachment ends 115 of the luminal structures 114 connect providing an uninterrupted pathway between one luminal structure 114 and another. The embodiment shown in FIG. 8 is an attachment structure embodied as an attachment collar 130. In order to attach two un-joined luminal structures 114, the attachment collar 130 is placed around one of the luminal structures 114, the attachment ends 115 of each luminal structure 114 are then placed together such that they abut one another. The attachment collar 130 is then slid over the connection point between the two luminal structures 114 to complete the attachment of the luminal structures 114. The resulting product is a complete luminal structure 114 providing a continuous connection between one end and another end on either side of the attachment collar 130.

What is claimed is:

1. An artificial anatomic model configured to geometrically mimic a human or non-human animal torso, wherein said torso comprises:
   one or more bones, wherein said one or more bones geometrically mimic at least a portion of one or more human or non-human animal bones;
   a cavity configured to receive at least one module, wherein said cavity and said at least one module is comprised of, in part, or in whole, a hydrogel, and said at least one module geometrically mimics at least a portion of a human or non-human animal organ;
   a muscular tissue, wherein the muscular tissue is comprised of, in part or in whole, a hydrogel, said muscular tissue geometrically mimics at least a portion of a human or non-human animal muscular tissue and simulates at least one predetermined physical characteristic of muscle tissue of said muscle possessing human or non-human animal anatomic tissue with at least fifty percent or more similarity;

one or more tendons, wherein the one or more tendons are comprised of, in part or in whole, a hydrogel, and said one or more tendons geometrically mimic at least a portion of a human or non-human animal tendon and simulate at least one predetermined physical characteristic of tendon tissue with at least fifty percent or more similarity;

one or more ligaments, wherein the one or more ligaments are comprised of, in part or in whole, a hydrogel, and said one or more ligaments geometrically mimic at least a portion of a human or non-human animal ligament and simulate at least one predetermined physical characteristic of ligament tissue with at least fifty percent or more similarity; and at least one luminal structure, wherein the at least one luminal structure is comprised of, in part or in whole, a hydrogel, said at least one luminal structure geometrically mimics at least a portion of a human or non-human animal luminal structure and simulates at least one predetermined physical characteristic of a luminal tissue of said lumen possessing human or nonhuman animal anatomic structure with at least fifty percent or more similarity.

2. The anatomic model of claim 1, wherein the at least one predetermined physical characteristic of muscle tissue, tendon tissue and/or ligament tissue comprises at least one of the following: color, tensile modulus, shear strength, puncture resistance, compressive modulus, dielectric constant, electrical conductivity, and/or thermal conductivity.

3. The anatomic model of claim 1, the at least one predetermined physical characteristic of luminal tissue comprises at least one of the following: coefficient of friction and abrasion resistance.

4. The anatomic model of claim 1, wherein said organ is a diseased organ.

5. The anatomic model of claim 1, wherein said muscular tissue is a diseased muscular tissue.

6. The anatomic model of claim 1, wherein said at least one luminal structure is diseased.

7. The anatomic model of claim 1, wherein said organ is a visceral organ.

8. The anatomic model of claim 7, wherein the visceral organ comprises at least one of kidneys, liver, gall bladder, pancreas and spleen.

9. The anatomic model of claim 1, wherein said organ is a sensory organ.

10. The anatomic model of claim 1, wherein at least one luminal structure is removably attachable to an organ, a muscle, a tendon, a ligament, or another luminal structure.

11. The anatomic model of claim 1, wherein the muscular tissue is removably attachable to the one or more bones by a composite pin.

12. The anatomic model of claim 1, wherein the cavity is an abdominal cavity, and said abdominal cavity is sealed such that it is capable of insufflation.

13. The anatomic model of claim 1, wherein the muscular tissue, the one or more tendons, the one or more ligaments, the one or more bones, and/or the at least one luminal structure are attachable to one another and/or to the cavity by an attachment mechanism comprising suture, Velcro, pins, composite pins, hook, and/or glue.

14. The anatomic model of claim 1, wherein the luminal structure comprises an attaching end, wherein the attaching end comprises an attachment piece, said attachment piece comprising a narrow collared portion and a flanged portion, wherein the narrow collared portion fits over the attaching end of the luminal structure, and wherein the luminal structure is folded around the outside of the flanged portion of the attachment piece.

15. The anatomic model of claim 14, wherein the at least one luminal structure is removably attachable to another of the at least one luminal structures, wherein the attaching ends of each luminal structure are joined together such that there is an uninterrupted communication between the at least one luminal structure and the other of the at least one luminal structures, providing a passageway between the luminal structures.

16. The anatomic model of claim 1, wherein the muscular tissue comprises multiple individual muscles.

17. The anatomic model of claim 1, wherein the modules are independently replaceable of one another.

18. The anatomic model of claim 16, wherein the multiple individual muscles are independently replaceable of one another.

19. The anatomic model of claim 1, wherein the at least one luminal structure is independently replaceable.

20. The anatomic model of claim 1, wherein the one or more bones are independently replaceable of one another.

21. The anatomic model of claim 1, wherein the one or more tendons are independently replaceable of one another.

22. The anatomic model of claim 1, wherein the one or more ligaments are independently replaceable of one another.

23. The anatomic model of claim 1, further comprising a skin layer, wherein said skin layer covers over at least a portion of the torso.

* * * * *